United States Patent [19]
Maus et al.

[11] Patent Number: 5,588,291
[45] Date of Patent: Dec. 31, 1996

[54] METHOD FOR CONTROLLING THE HEATING OF AN ELECTRICALLY HEATABLE CATALYTIC CONVERTER

[75] Inventors: Wolfgang Maus; Rolf Brück; Helmut Swars, all of Bergisch Gladbach, Germany

[73] Assignee: Emitec Gesellschaft fuer Emissionstechnologie mbH, Lohmar, Germany

[21] Appl. No.: 458,493

[22] Filed: Jun. 2, 1995

Related U.S. Application Data

[63] Continuation of PCT/EP93/03058, Nov. 2, 1993.

[30] Foreign Application Priority Data

Dec. 9, 1992 [DE] Germany ............... 42 41 494.6

[51] Int. Cl.[6] ............................................. F01N 3/20
[52] U.S. Cl. .................... 60/274; 60/297; 60/300
[58] Field of Search ............... 60/274, 284, 297, 60/300

[56] References Cited

U.S. PATENT DOCUMENTS

| | | |
|---|---|---|
| 2,942,932 | 6/1960 | Elliott . |
| 3,957,444 | 5/1976 | Goto ............................................. 60/277 |
| 5,146,743 | 9/1992 | Maus et al. . |
| 5,315,824 | 5/1994 | Takeshima ................................. 60/300 |
| 5,339,628 | 8/1994 | Maus ........................................... 60/277 |

FOREIGN PATENT DOCUMENTS

| | | | |
|---|---|---|---|
| 3516981 | 11/1986 | Germany ............................ 60/277 |
| 92/12334 | 7/1992 | WIPO . |

OTHER PUBLICATIONS

Patent Abstracts of Japan, vol. 131, No. 89, May 8, 1989 & JP-87-0170487 (Yanmar) Jul. 8, 1987.

Primary Examiner—Douglas Hart
Attorney, Agent, or Firm—Herbert L. Lerner; Laurence A. Greenberg

[57] ABSTRACT

A catalytic converter is connected downstream of an internal combustion engine of a motor vehicle and has at least a short portion to be quickly electrically heated. A method for controlling the heating of the catalytic converter includes turning on electric heating only after a delay after starting the internal combustion engine, if a rate of temperature change in the heatable portion of the catalytic converter, being caused by heat contained in exhaust gases of the internal combustion engine, is no greater than approximately a rate of temperature change attainable by electric heating.

19 Claims, 2 Drawing Sheets

METHOD FOR CONTROLLING THE HEATING OF AN ELECTRICALLY HEATABLE CATALYTIC CONVERTER

CROSS-REFERENCE TO RELATED APPLICATION

This application is a Continuation of International Application Ser. No. PCT/EP93/03058, filed Nov. 2, 1993.

BACKGROUND OF THE INVENTION

Field of the Invention

The present invention relates to a method for controlling the heating of a catalytic converter being connected downstream of an internal combustion engine of a motor vehicle and having at least a short portion which can be electrically heated fast.

Catalytic converters are used to reduce the pollutant emissions from motor vehicles, and legal requirements in terms of the maximum upper limits of pollutants are becoming ever stricter. Since catalytic converters cannot reduce the emission of pollutants until after a certain warmup time has elapsed, without supplementary heating, catalytic converters for meeting especially stringent requirements are provided that can be heated electrically in at least some portions, so that they can be more quickly brought to a temperature required for the catalytic conversion. Such heatable honeycomb bodies have meanwhile been developed to such an advanced extent that models with low mass and a short length are available in which high rates of temperature change can be attained by electric heating. Given a suitably small surface area, that can even be carried out in the relatively cool exhaust gas stream in the cold-starting phase of an internal combustion engine. However, directly after starting of such an engine, the rate of temperature change in the exhaust gas system is nevertheless quite high. It is only after some time that the rate of change drops markedly. Other phenomena, such as the evaporation of water present beforehand in the catalytic converter and in the exhaust system, also affect the temperature behavior of the exhaust system during the cold-starting phase.

Various procedures for controlling such heatable catalytic converters are described, for instance, in U.S. Pat. No. 5,146,743. However, they do not take the above considerations into account, and they apply primarily to electrically heatable honeycomb bodies with low rates of temperature change. In fact, however, practical aspects which must also be taken into consideration limit the possibilities for controlling an electrically heatable catalytic converter. First, given the capacity of the vehicle battery, only a limited amount of electrical energy is available and it must be employed as economically as possible, since energy reserves must be kept adequate for various modes of operation of a motor vehicle, especially including driving short distances in the winter. For reasons of convenience as well as safety in dangerous situations, it is also not desirable, before the engine is started, to have to first wait through a heating period before starting can be performed. Such considerations have led to various heating strategies in the prior art, which begin directly after starting of the engine and introduce a high electrical output for 8 to 20 seconds. The purpose thereof is to put the catalytic conversion into operation as fast as possible, at least in a portion of the catalytic converter, in order to be able to utilize the chemical energy present in the engine exhaust gases for further heating of the catalytic converter as soon as possible.

SUMMARY OF THE INVENTION

It is accordingly an object of the invention to provide a method for controlling the heating of an electrically heatable catalytic converter, which overcomes the hereinafore-mentioned disadvantages of the heretofore-known methods of this general type and which utilizes the available electrical energy even more economically and effectively, in order to thereby further reduce pollutant emissions without overloading the electrical system of the motor vehicle.

With the foregoing and other objects in view there is provided, in accordance with the invention, in a method for controlling the heating of a catalytic converter being connected downstream of an internal combustion engine of a motor vehicle and having at least a short portion to be quickly electrically heated, the improvement which comprises turning on electric heating only after a delay after starting the internal combustion engine, if a rate of temperature change in the heatable portion of the catalytic converter, being caused by heat contained in exhaust gases of the internal combustion engine, is no greater than approximately a rate of temperature change attainable by electric heating.

The invention is based on the recognition that immediately after starting of the engine, the exhaust gases, which are quite hot relative to the catalytic converter, already initially heat the catalytic converter very fast, before the rate of temperature change then drops. Additional electrical heating would hardly achieve faster heating, yet it would consume valuable electrical energy. A further consideration is that water can collect beforehand in the ceramic coating of a catalytic converter, which has a very large surface area, and in the exhaust system, either if the vehicle has been standing for a long time or from the water ingredients of the exhaust gas that initially condense upon starting of the cold engine. In heating strategies in which heating is performed before or immediately after starting of the engine, valuable electrical energy is also used to evaporate water from the catalytic converter, since its temperature cannot be brought to the requisite temperature for catalytic conversion, which, for example, is 350° C., until after the water has evaporated. According to the present invention, the heat in the engine exhaust gas is utilized in the first few seconds in the rapid heating of the catalytic converter, and is also utilized to evaporate the water in the catalytic converter. It is only later, if the rate of temperature change in the catalytic converter attainable by the exhaust gas drops markedly, that the electric heater is turned on, so that the available electrical energy can be utilized very effectively for rapid further heating of a small portion to the necessary temperature for the catalytic conversion. Heating outputs of 750 to 2500 watts, corresponding to approximately 75 to 250 amps for a 12 volt system, and preferably 1000 to 2000 watts, are considered advantageous. However, higher current intensities are also possible. The portion to be heated needs to be only a few millimeters long, for instance from 3 to 20 mm and preferably from 6 to 15 mm, since a disk thus heated jointly heats the end surface of the next honeycomb body, and the energy liberated by catalytic conversion in the heated disk likewise contributes immediately to heat the subsequent portions.

Due to low mass and a small surface area, rapid heating and a temperature in the heated portion that is 150° to 200° C. above its temperature in the exhaust gas stream as well, can be attained.

In accordance with another mode of the invention and in keeping with these considerations, the heating begins approximately 3 to 10 seconds and preferably approximately 5 seconds after the start of the engine, and depending on the engine operating mode and the available electrical output, it lasts for from 5 to 25 seconds and preferably approximately 10 to 20 seconds.

In accordance with a further mode of the invention, the precise onset of heating is fixed as a function of the ambient temperature and/or the engine temperature and/or the temperature in the catalytic converter itself. Other measured values that may be available for engine control purposes can also be taken into account. The goal is to not use electrical energy unnecessarily. In particular, limit values can be fixed for various physical variables, beyond which electric heating is not performed at all. For instance, heating naturally makes no sense when the engine is at operating temperature, or especially when the catalytic converter is still hot. At certain ambient temperature values as well, the electric heating can hardly provide any further effect, for instance at ambient temperatures above 35° C. For reasons of battery capacity, the electric heating can also be dispensed with below certain ambient temperatures, for instance below a value to be fixed by a particular legislative body, so as not to overload the battery.

In accordance with an added mode of the invention, the engine is operated with an increased idling rpm and a lean mixture before the heating is turned on.

In accordance with an additional mode of the invention, after the heating is turned on, if at least the heatable portion of the catalytic converter has reached a sufficiently high temperature to convert carbon monoxide and/or hydrocarbons, the engine can be operated at a reduced idling rpm and with a rich mixture. The effect of the first provision is major energy development in the initial phase, while the second provision furnishes greater chemical energy if the necessary temperature in the catalytic converter for the catalytic conversion is reached, so that exothermic reactions take place and other parts of the catalytic converter are heated up. In the present invention, the heating strategy is therefore preferably not adapted to a specific engine control system, but instead the engine control system is adapted to the heating strategy.

In accordance with yet another mode of the invention, the reduction in the rpm, that is the reduction in the exhaust gas throughput in the catalytic converter, is performed in one or more stages, with each of these stages being at temperatures in the catalytic converter at which throughput reductions cause a temperature increase. Due to the complicated chemical-physical processes in a catalytic converter, such situations can occur precisely in such transient events as the cold-starting phase. When the catalytic conversion is just beginning, the surface of the catalytic converter is saturated with "reaction-ready reaction partners", so that while the cooling action of the exhaust gas stream decreases upon a throughput reduction, nevertheless the chemical reaction does not immediately decrease. Such phenomena, which differ from one system to another, can, for instance, also be exploited in the heating strategy for the cold-starting phase.

In principle, turning the electric heater on and off can be determined by time intervals. However, in accordance with yet a further mode of the invention, it is more advantageous to determine the end of the heating period by means of a temperature measurement, which should preferably be performed in a portion of the catalytic converter directly downstream of the electrically heatable portion, since the temperature in this downstream portion is important for further heating of the catalytic converter.

In accordance with yet an added mode of the invention, the onset and/or the end of the heating can also be ascertained by using engine control data, by ascertaining the heat energy generated in the engine from the measured air and fuel quantities, for instance, although other measured values such as the coolant temperature and the ambient temperature can also be taken into consideration.

In accordance with yet an additional mode of the invention, the onset and the end of heating and thus the heat energy to be introduced is predetermined, and the engine is controlled accordingly. Interventions in the idling performance of an engine during the first approximately 20 seconds of the cold-starting phase represent no particular impairment of driving comfort and no impairment whatever of driving safety, so that it can certainly be appropriate in cold-starting to specify certain minimum and maximum rpm's and certain values for the fuel/air mixture.

In accordance with again another mode of the invention, further improvement in pollutant emissions is attained by connecting an adsorption device for hydrocarbons and/or carbon monoxide, in particular a zeolite body, that can be circumvented by means of a bypass line, between the engine and the catalytic converter. Before a sufficiently high temperature for conversion is reached in the catalytic converter, the exhaust gas is passed through the adsorption device, and a large portion of the hydrocarbons are then adsorbed in the zeolite body. If the necessary temperature for catalytic conversion is reached, the exhaust gas is then made to circumvent the adsorption device through the bypass line, so as to further heat the catalytic converter rapidly by the conversion of the exhaust gas. Later, during further operation of the motor vehicle, the adsorption device then heats up far enough, even if exhaust gas is not flowing through it, to ensure that the adsorbed hydrocarbons escape again and can be converted into harmless ingredients in the catalytic converter.

In accordance with a concomitant mode of the invention, in the case of an electrically heatable catalytic converter, if dangerous situations or even damage is to be avoided, security against overheating must generally be provided. Temperature sensors or other measurement sensors that are known per se, which can ascertain the occurrence of misfiring in the engine, for instance, are suitable therefor. If the danger of overheating develops, then the heating of the catalytic converter must first be turned off. Other provisions such as changing the fuel/air mixture, turning off overrunning, or the like may possibly be necessary in the engine control system as well.

Other features which are considered as characteristic for the invention are set forth in the appended claims.

Although the invention is illustrated and described herein as embodied in a method for controlling the heating of an electrically heatable catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
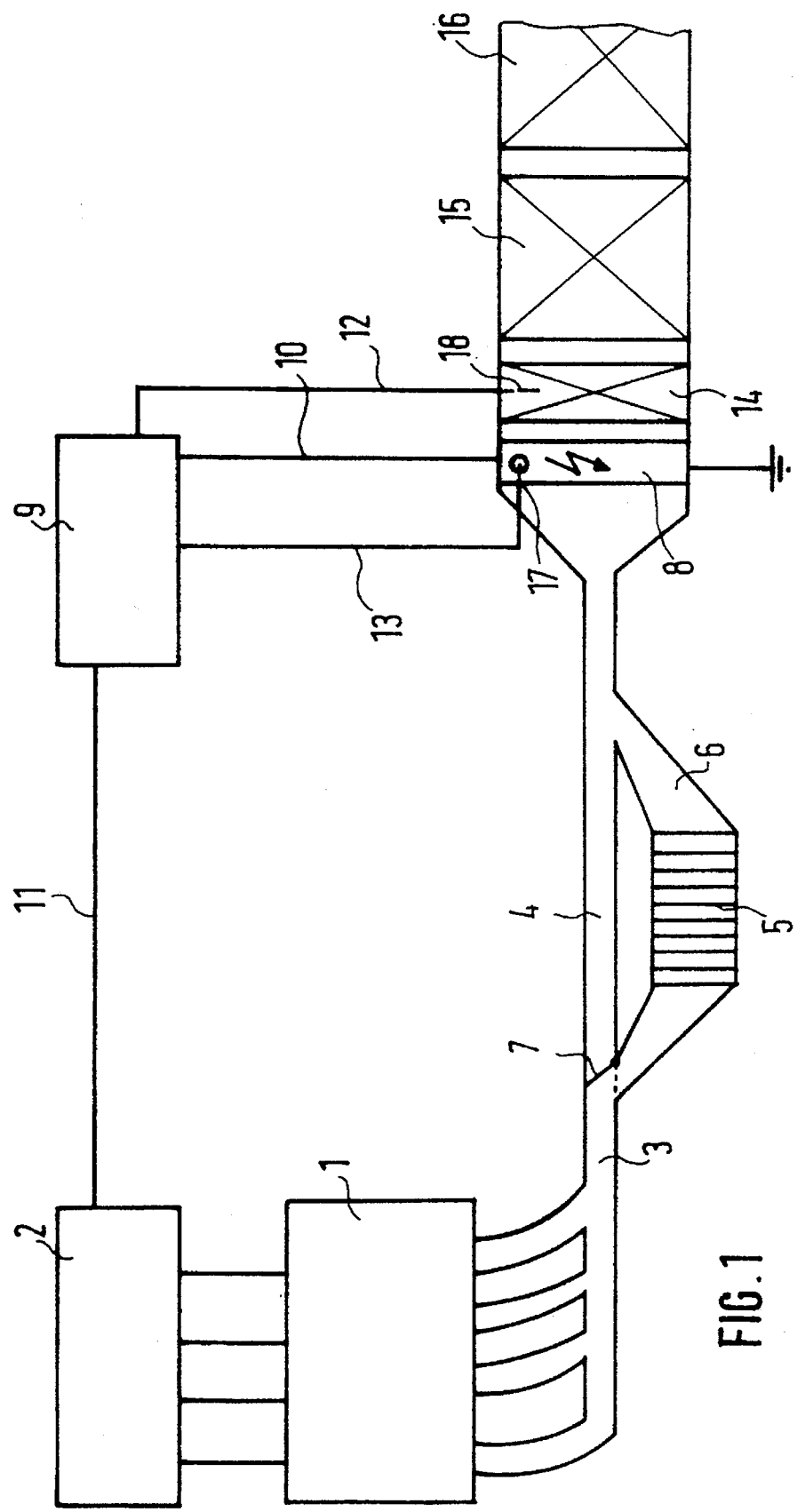
FIG. 1 is a schematic and diagrammatic view of a basic layout of an engine with an exhaust gas system.

Referring now to the figures of the drawing in detail and first, particularly, to FIG. 1 thereof, there is seen an internal combustion engine 1 with an engine control system 2 and an exhaust outlet 3. This outlet communicates through a line 4 with a catalytic converter 8, 14, 15, 16, which is made up of a plurality of portions. A forwardmost portion 8 is electrically heatable, and the heating is triggered by a heat control 9 through a heating supply line 10. The heatable portion 8 is followed by a precatalytic converter 14, which is followed by one or more main catalytic converters 15, 16. The individual portions of the catalytic converter 8, 14, 15, 16 may also be accommodated in individual housings being joined together by line segments, but this does not play any decisive role for the present invention. The diameters, layout and number of flow channels per unit of cross-sectional area may also differ in the various portions. In any case, a spatially closely-spaced or compact configuration is advantageous, because this avoids unnecessary heat losses to intervening segments. A temperature sensor 18 in the precatalytic converter 14 communicates with the heat control 9 through a measurement line 12. An additional measurement sensor 17 at the heatable portion 8 likewise communicates with the heat control 9, through a measuring line 13, and can ascertain the exceeding of a limit temperature in its vicinity. Disposed between the engine control system 2 and the heat control 9 is a connection 11, with which data can be transmitted in one or both directions, depending on the heating strategy that is contemplated. Parallel to the exhaust gas line 4, an adsorption device 5 for adsorbing hydrocarbons in the cold-starting phase can be connected in a side branch 6. A valve or flap 7 controls the flow of exhaust gas either through the adsorption device or through the exhaust gas line 4, which serves as a bypass line around the side branch 6.

Figure 2:
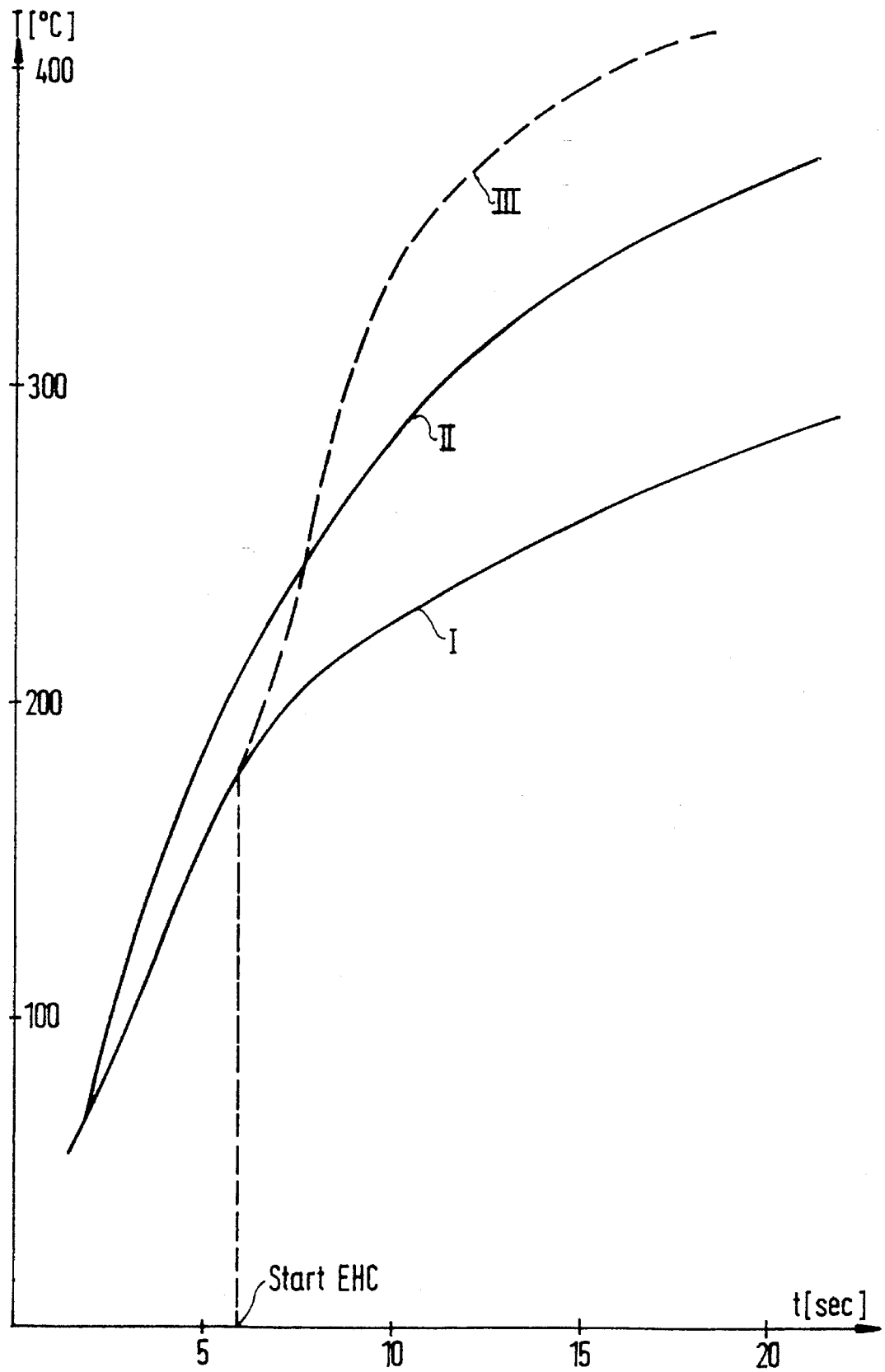
FIG. 2 is a diagram of temperature courses in the catalytic converter during a cold-starting phase.

FIG. 2 shows a qualitative diagram, on which the time t is plotted on the X axis and the temperature T is plotted on the Y axis. A curve I indicates the temperature course in the catalytic converter without electric heating during the cold-starting phase. A curve II shows the temperature course when electrical heating begins directly after starting for a relatively large, high-mass portion of a catalytic converter. A curve III shows the temperature course for the heating strategy according to the invention, in which a relatively small portion of the catalytic converter is supplied with the same output as for the curve II, but over a shorter time interval. It is immediately apparent that in the curve III, much higher temperatures are achieved in a shorter time than with the curve II, without using electrical energy, where the exhaust gas can bring about virtually the same rate of temperature change.

With the method of the invention, electrical heating of a catalytic converter can be performed with optimal utilization of the available electrical energy, so that stringent exhaust gas regulations can be met, at reasonable effort and expense.

We claim:

1. In a method for controlling the heating of a catalytic converter being connected downstream of an internal combustion engine of a motor vehicle and having at least a short portion to be quickly electrically heated, the improvement which comprises:

turning on electric heating only after a delay after starting the internal combustion engine, if a rate of temperature change in the heatable portion of the catalytic converter, being caused by heat contained in exhaust gases of the internal combustion engine, is no greater than approximately a rate of temperature change attainable by electric heating.

2. The method according to claim 1, which comprises turning on the electric heating after approximately 3 to 10 seconds.

3. The method according to claim 1, which comprises turning on the electric heating after approximately 5 seconds.

4. The method according to claim 1, which comprises fixing a precise moment that heating begins as a function of at least one of ambient temperature, engine temperature and catalyst temperature.

5. The method according to claim 4, which comprises performing no electric heating if predeterminable threshold values of at least one of the ambient temperature, the engine temperature and the catalyst temperature are exceeded or fail to be attained.

6. The method according to claim 1, which comprises operating the engine with an increased idling rpm and a lean mixture, at least before the heating is turned on.

7. The method according to claim 1, which comprises operating the engine at a reduced idling rpm and a richer mixture after the heating is turned on, if at least the heatable portion of the catalytic converter has attained a sufficiently high temperature to convert monoxide and hydrocarbons.

8. The method according to claim 7, which comprises changing the idling rpm and changing the exhaust gas throughput in the catalytic converter, in at least one stage.

9. The method according to claim 8, which comprises changing the idling rpm and changing the exhaust gas throughput in the catalytic converter at temperatures in the catalytic converter at which throughput reductions cause a temperature increase.

10. The method according to claim 1, which comprises ascertaining an attainment of a sufficiently high temperature for catalytic conversion by a temperature measurement in a portion of the catalytic converter downstream of the electrically heatable portion.

11. The method according to claim 1, which comprises ascertaining an attainment of a sufficiently high temperature for catalytic conversion by a temperature measurement in a precatalytic converter of the catalytic converter downstream of the electrically heatable portion.

12. The method according to claim 1, which comprises ascertaining at least one of a precise onset of heating and an end of heating, by taking into account data for controlling the engine, in which heat energy generated in the engine is ascertained.

13. The method according to claim 12, which comprises ascertaining the heat energy generated in the engine from measured air and fuel quantities.

14. The method according to claim 1, which comprises predetermining an onset and an end of heating and a heating energy to be introduced, and controlling the engine for generating the slightest possible quantities of pollutants and the most possible heat, before a sufficiently high temperature for the catalytic conversion is attained.

15. The method according to claim 1, which comprises:

connecting an adsorption device for at least one of hydrocarbons and carbon monoxide between the engine and the catalytic converter, connecting a bypass line for bypassing the adsorption device, and carrying waste gas through the adsorption device and only later making the waste gas circumvent the adsorption device through the bypass line, before a sufficiently high temperature for the conversion is attained in the catalytic converter.

16. The method according to claim 15, which comprises connecting a zeolite body between the engine and the catalytic converter as the adsorption device.

17. The method according to claim 1, which comprises ending the heating in the event that measuring sensors indicate a danger of overheating in the catalytic converter.

18. The method according to claim 17, which comprises indicating a danger of overheating in the catalytic converter in the event of misfiring in the engine.

19. The method according to claim 17, which comprises indicating a danger of overheating in the catalytic converter with temperature sensors.

* * * * *